United States Patent [19]
Takahashi et al.

[11] Patent Number: 6,049,115
[45] Date of Patent: Apr. 11, 2000

[54] SCANNING PROBE MICROSCOPE, AND SEMICONDUCTOR DISTORTION SENSOR FOR USE THEREIN

[75] Inventors: Hiroshi Takahashi; Nobuhiro Shimizu; Yoshiharu Shirakawabe, all of Chiba, Japan

[73] Assignee: Seiko Instruments Inc., Japan

[21] Appl. No.: 08/842,845

[22] Filed: Apr. 17, 1997

[30] Foreign Application Priority Data

Apr. 18, 1996 [JP] Japan ................................ 8-097120
Feb. 27, 1997 [JP] Japan ................................ 9-044372

[51] Int. Cl.[7] .......................... H01L 29/82; G01P 15/00; G01P 9/00; G01N 23/00
[52] U.S. Cl. ................. 257/417; 73/504.15; 73/514.36; 250/307
[58] Field of Search .............................. 438/52; 257/417; 73/504.15, 514.36, 105; 250/306, 307

[56] References Cited

U.S. PATENT DOCUMENTS 4,422,063  12/1983  Pryor ............................................ 338/2
5,489,774  2/1996  Akamine et al. ......................... 250/234

FOREIGN PATENT DOCUMENTS

441324A1  8/1991  European Pat. Off. .
92-12398  7/1992  WIPO .
94-29894  12/1994  WIPO .

OTHER PUBLICATIONS

Technical Digest of the International Electron Devices Meeting (IEDM), Wa, Dec. 10, 1995, pp. 597–600, A.P. Frierich et al., "Lateral Backward Diodes as Strain Sensors".

Primary Examiner—Brian Dutton
Attorney, Agent, or Firm—Adam & Wilks

[57] ABSTRACT

A semiconductor distortion sensor comprises a flexible cantilever having a free end portion and a fixed end portion. A p-type region and an n-type region define a pn junction formed in a preselected region of the cantilever where stress-caused distortion occurs due to flexure of the cantilever upon displacement of the free end portion of the cantilever. When the free end portion of the cantilever is subjected to displacement, the cantilever is flexed and the amount of displacement of the free end portion of the cantilever is detected on the basis of a change in an electrical characteristic of the pn junction.

25 Claims, 12 Drawing Sheets

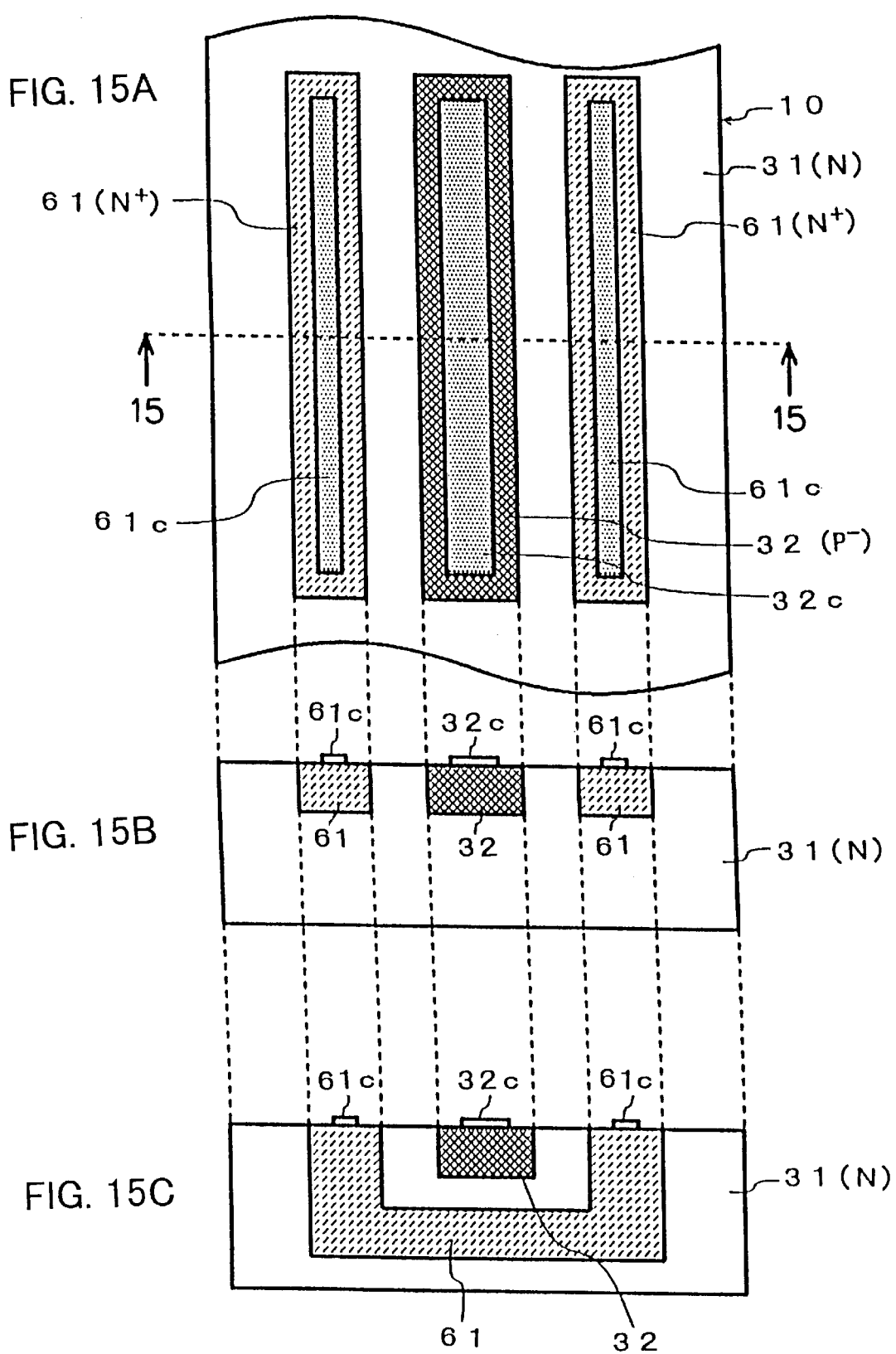

FIG. 17A
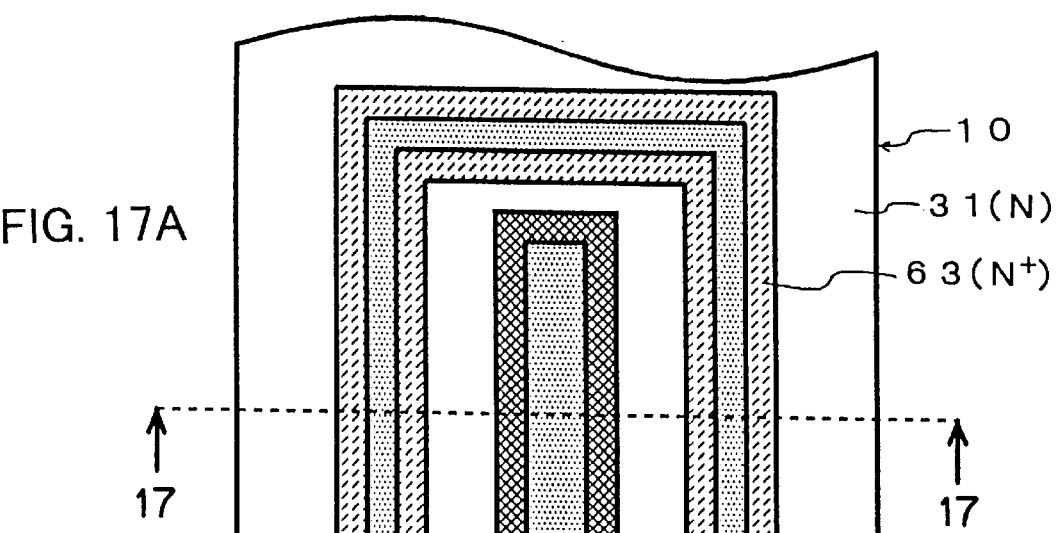
FIG. 17B
FIG. 17C
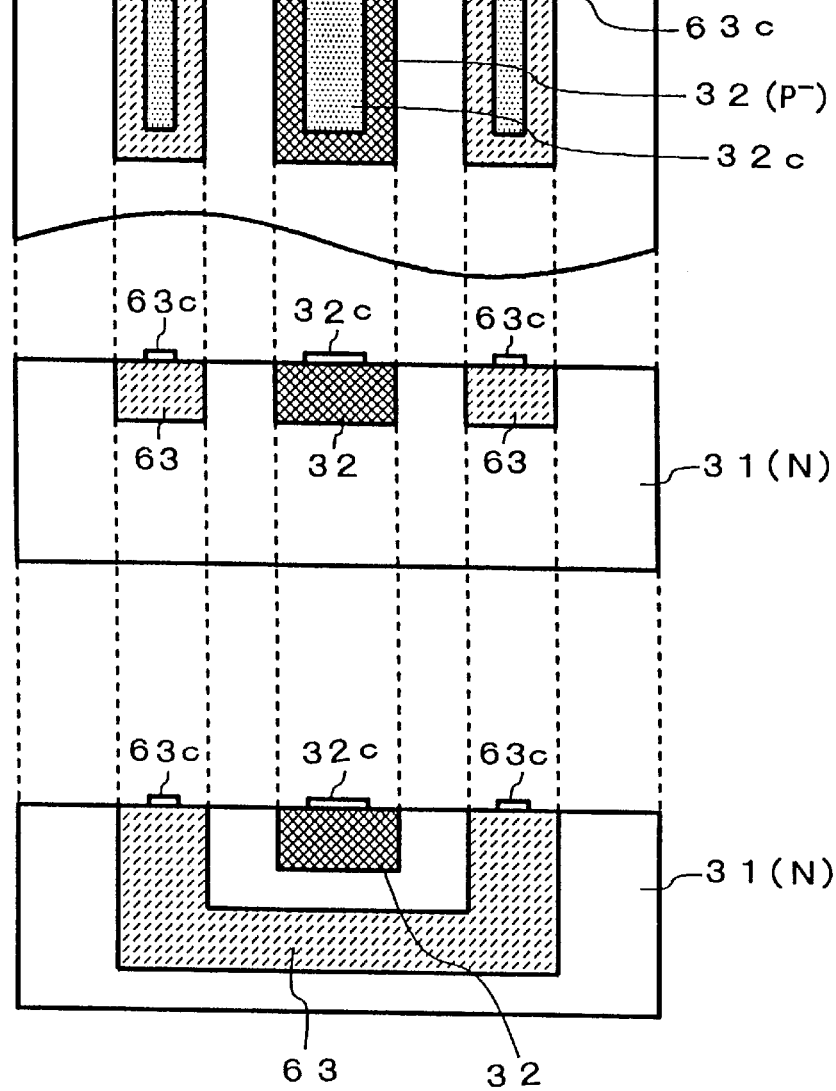

SCANNING PROBE MICROSCOPE, AND SEMICONDUCTOR DISTORTION SENSOR FOR USE THEREIN

BACKGROUND OF THE INVENTION

The present invention relates to a scanning probe microscope, semiconductor distortion sensor for use therein and a manufacturing process for manufacture thereof. More particularly, the invention concerns a scanning probe microscope suitable for use as a scanning type inter-atomic force microscope (AFM Atomic Force Microscope), semiconductor distortion sensor for use therein, and a manufacturing process for manufacture thereof. More specifically, the invention concerns a semiconductor distortion sensor in which a pn junction is formed in a flexible portion of a cantilever that has been constructed of a semiconductor substrate to thereby enable the detection of the amount of flexure of the cantilever as a change in the diode characteristic at the pn junction portion, a manufacturing process therefor and a scanning probe microscope that has adopted this semiconductor distortion sensor as the cantilever.

In a conventional scanning type inter-atomic force microscope (AFM), a probe is mounted on the free end of the cantilever, whereby the amount of flexure of the cantilever which is produced when the probe moves up and down in corresponding relation to the irregularities of the sample surface has hitherto been detected using optical interferometries, optical beam deflections techniques, etc. However, these optical detection methods have involved therein the problem that the relevant construction is complex and the relevant adjustment also is difficult. On the other hand, recently, as a sensor for detecting the amount of flexure, acceleration, etc. there has become widely used a semiconductor distortion sensor that has the feature of its being small in size and light in weight and of enabling direct output of the amount of flexure as an electric signal. This semiconductor distortion sensor has come to be adopted also in the cantilever of the AFM.

As illustrated in, in for example, FIG. 13, the conventional cantilever type semiconductor distortion sensor is composed of a cantilever arm portion (beam portion) 1 which has a free end 1a that has been formed by etching selectively a part 2 of a semiconductor substrate into the shape of "a letter U" and a gauge portion 3 that has been formed near a fixed end and its vicinity (the foot) of the cantilever arm portion 1. The gauge portion 3 detects the stress-caused distortion that occurs therein in corresponding relation to the amount of flexure of the free end 1a and outputs it by converting it to an electric signal, As is described in, for example, Japanese Patent Laid-Open Publication No. 5-196458, in the conventional semiconductor distortion sensor, the gauge portion 3 is constructed of a piezoresistive resistor. Since the piezoresistive resistor has its electrical resistance varied upon application thereto of a stress, the detection of the amount of flexure has hitherto been performed by measuring the change in the resistance of the piezoresistive resistor by a resistance bridge circuit such as a Wheatstone bridge circuit.

As mentioned above, when the amount of flexure of the cantilever attempts to be detected as the stress-caused distortion applied to the piezoresistive resistor, since in the case of the piezoresistive resistor the rate of change in the resistance, in other words, rate of change in the voltage or current, relative to the amount of distortion is low and the measuring sensitivity is low, the detection of the amount of flexure not only requires the use of a complex resistance bridge circuit but also raises the problem that it is necessary to adjust very accurately the respective resistors that constitute the resistor bridge circuit.

The object of the present invention is to provide a semiconductor distortion sensor which solves the above-mentioned problems of the prior art and outputs the amount of flexure of the cantilever as a large change in signal with a simple structure, a manufacturing process therefor and a scanning probe microscope that has adopted this semiconductor distortion sensor as its cantilever.

SUMMARY OF THE INVENTION

In order to attain the above object, in the present invention, the following means has been adopted.

(1) The semiconductor distortion sensor of the present invention is constructed of a cantilever having a free end and a fixed end, a pn junction that is formed in a region of the cantilever where stress-caused distortion occurs due to the displacement of the free end thereof, and contact regions that are formed respectively in a p type region and n type region that form the pn junction.

(2) The manufacturing process for the semiconductor distortion sensor of the present invention comprises a step of etching a first conductivity type semiconductor substrate to thereby form a cantilever having a free end and a fixed end, a step of forming a mask so as for a region of the cantilever portion where stress-caused distortion occurs due to the displacement of the free end to be exposed, and a step of introducing a second conductivity type impurity into the surface of the exposed portion to thereby form a pn junction in at least the region undergoing the occurrence of the stress-caused distortion.

(3) The scanning probe microscope of the present invention has used as a scanning probe thereof the cantilever type semiconductor distortion sensor wherein the pn junction has been formed in the region where the stress-caused distortion occurs due to the displacement of the free end.

According to the above-mentioned construction (1), since when the free end of the cantilever is flexed stress-caused distortion occurs in the pn junction portion with the result that the electrical characteristic (diode characteristic) of the pn junction largely changes, if this change is detected with the use of an appropriate detection circuit, it is possible to measure the amount of flexure of the free end.

According to the above-mentioned construction (2), it is possible to manufacture readily the cantilever type semiconductor distortion sensor wherein the pn junction is formed in the region where stress-caused distortion occurs due to the displacement of the free end.

According to the above-mentioned construction (3), since the amount of flexure of the cantilever can be reproduced as a change in the electrical characteristic of the pn junction, it becomes possible to observe the surface configuration of the sample with a high sensitivity.

BRIEF DESCRIPTION OF THE DRAWINGS

FIG. 15A–15C presents a plan view and sectional views illustrating an eighth enmbodiment of the present invention.

FIG. 17A–17C presents a plan view and sectional views illustrating a tenth embodiment of the present invention.

DETAILED DESCRIPTION OF THE PREFERRED EMBODIMENTS

Figures 1A, 1B:
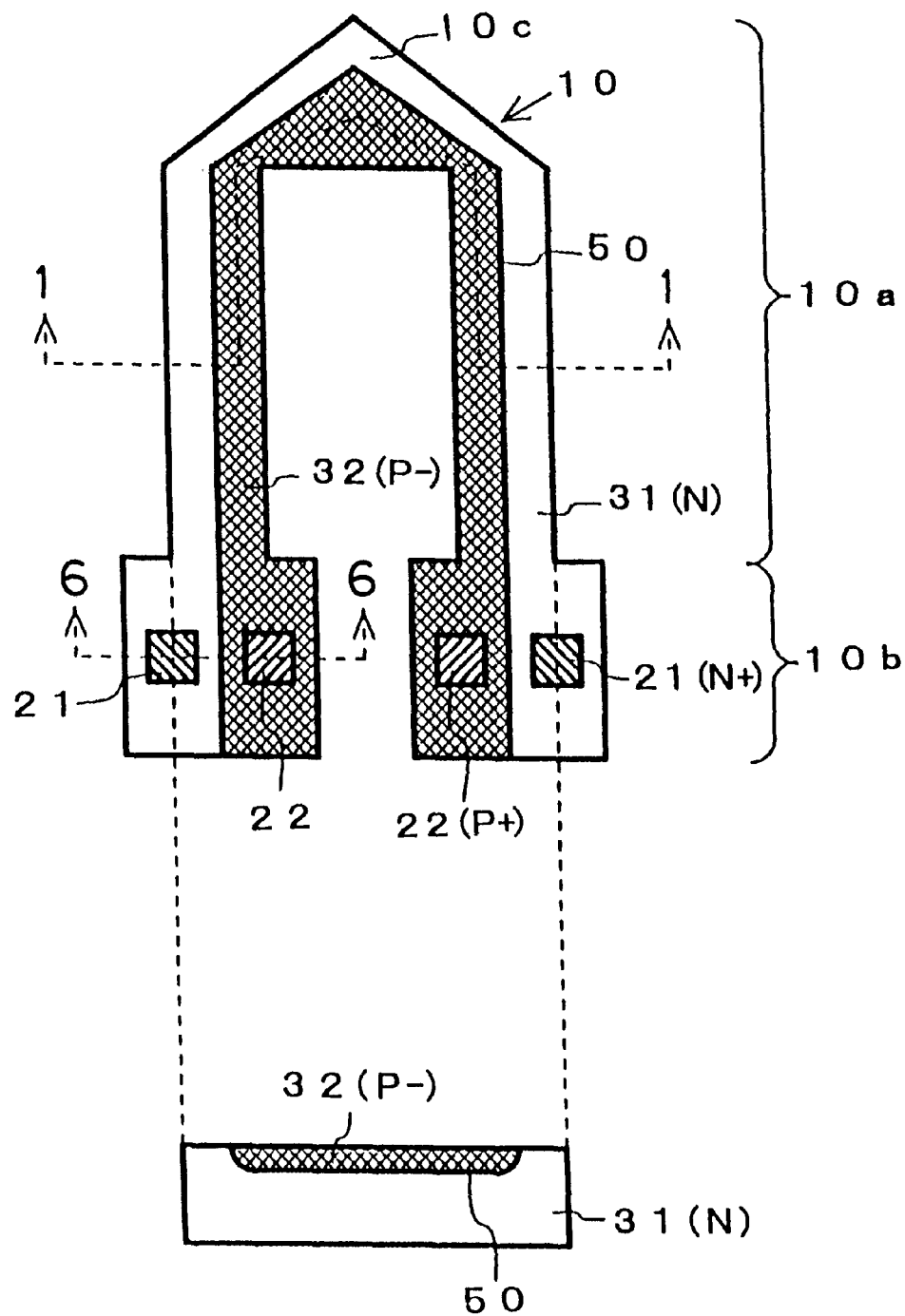
FIGS. 1A and 1B are a plan view and a sectional view illustrating a first embodiment of the present invention.

The present invention will now be explained in detail with reference to the drawings. FIG. 1A is a plan view illustrating a cantilever type semiconductor distortion sensor according to a first embodiment of the present invention and FIG. 1B is a sectional view taken along a line 7—7 of FIG. 1A.

A cantilever 10 of the present invention is composed of a U-shaped cantilever arm portion 10a and a support portion 10b, the cantilever arm portion 10a being provided at a forward (free end) end 10c thereof with a probe (not illustrated) for use in an AFM. In this embodiment, the cantilever 10 is constituted by an N type substrate 31, and a P– diffusion region 32 is formed in the surface of an inward portion of the U-shaped portion, Since a pn junction 50 is formed at the boundary between the P– diffusion region 32 and N type substrate 31, it results in this embodiment that the pn junction 50 is formed in the shape of a letter U along the U-shaped cantilever arm portion 10a. In the support portion 10b, N+ contact regions 21 are formed in an N type substrate region and P+ contact regions 22 are formed in the P– region 32.

By this construction, when the probe is scanned by the surface of a sample, since the cantilever arm portion 10a of the cantilever 10 is flexed about the support portion 10b in corresponding relation to the surface configuration of the sample, a stress-caused distortion occurs in the pn junction 50 formed in the arm portion 10a, at which the diode characteristic changes.

Figure 2A:
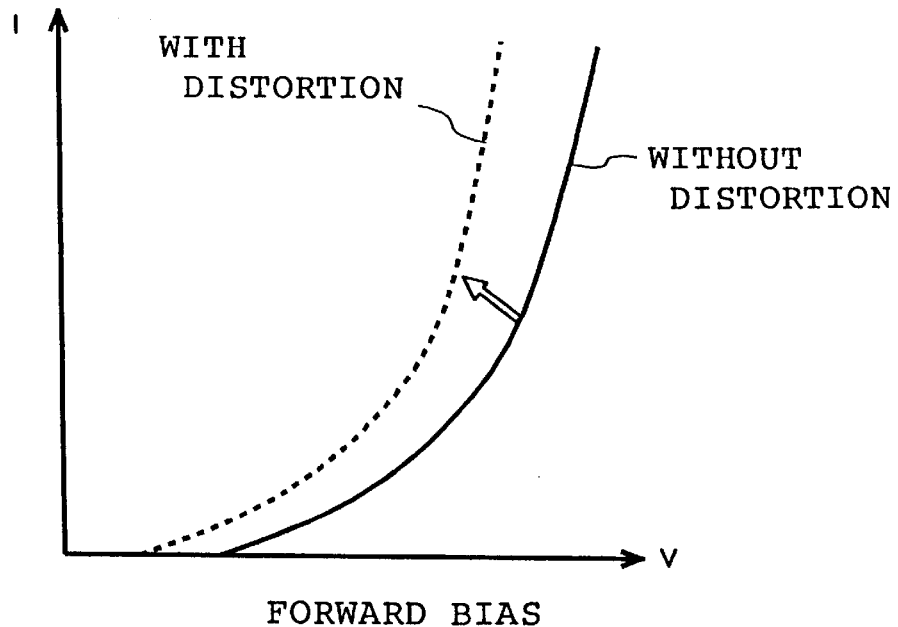
FIGS. 2A and 2B are graphic diagrams each illustrating the diode chaacteristic of the pn junction.
Figure 2B:
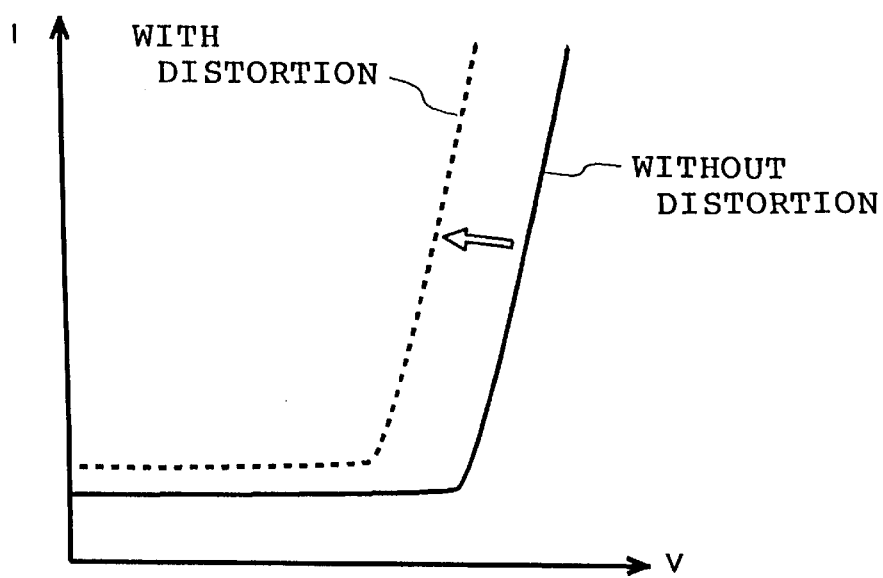

FIG. 2A and 2B present graphic diagrams illustrating states where the diode characteristic of the pn junction changes due to the stress-caused distortion. FIG. 2A illustrates the diode characteristic that is obtained when forward bias is in effect, and FIG. 2B illustrates the diode charateristic that is obtained when reverse bias is in effect, From these graphic diagrams it is seen that during the forward bias, when the stress distortion occurs in the pn junction, the applied voltage that starts the flow of the forward current becomes low with the result that the proportion of the forward current IO to the applied voltage becomes high. Also, during the reverse bias, when the distortion occurs, the break voltage becomes low with the result that the leakage current increases.

Figure 3:
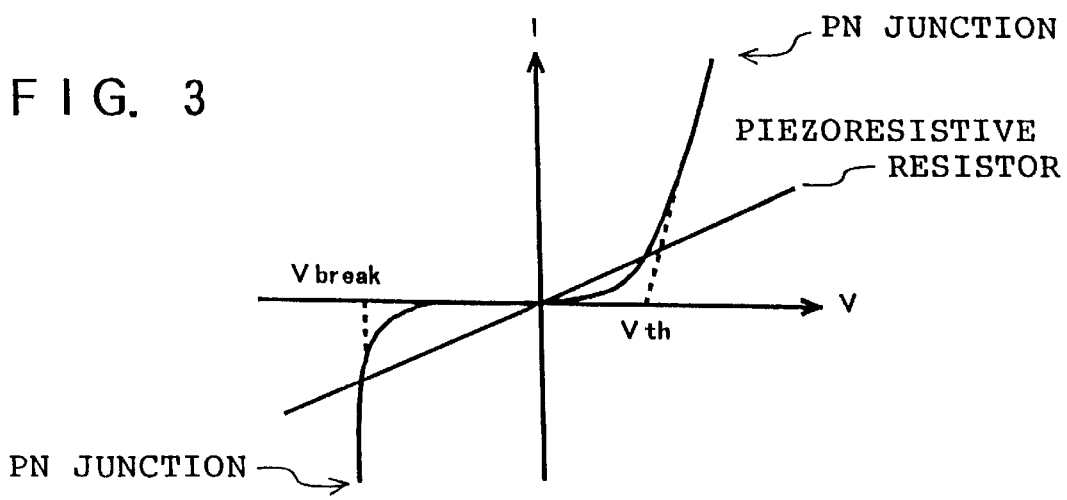
FIG. 3 is a graphic diagram illustrating a comparison of the I–V characteristic of the pn junction and that of a piezoresistive resistor.
Figure 4:
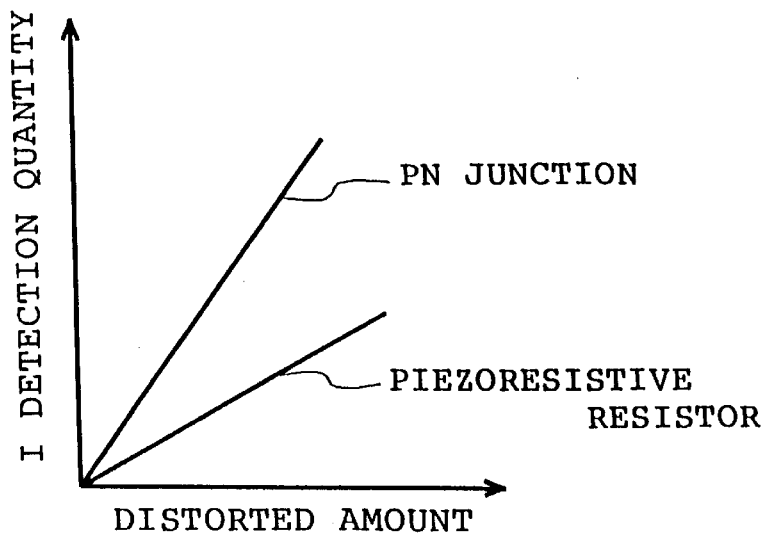
FIG. 4 is a graphic diagram illustrating a comparison of the I-distorted amount characteristic of the pn junction and that of the piezoresistive resistor.
Figure 5:
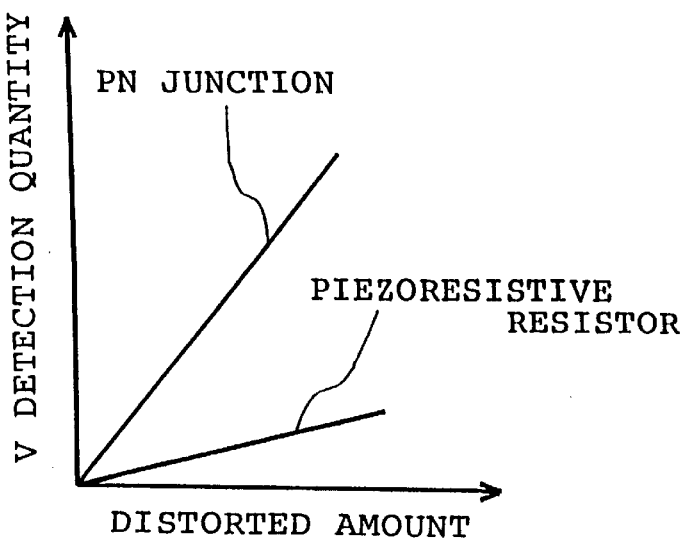
FIG. 5 is a graphic diagram illustrating a comparison of the V-distorted amount characteristic of the pn junction and that of the piezoresistive resistor.

FIGS. 3, 4 and 5 are graphic diagrams illustrating the I–V characteristic, current I-distorted amount characteristic and voltage V-distorted amount characteristic of the pn junction as compared to those of the piezoresistive resistor. The rate of change in the current I and voltage V relative to the distorted amount is higher in the case of the pn junction than in the case of the piezoelectric element. The rate of change in the current I relative to the voltage V also is higher in the case of the pn junction than in the case of the piezoelectric element. Accordingly, if as in this embodiment the pn junction is formed in the flexure portion of the cantilever 10 to thereby detect a change in the diode characteristic of the pn junction, the detection sensitivity with respect to the distorted amount is increased, whereupon it becomes possible to measure accurately the amount of flexure of the cantilever 10 without using a precision circuit such as a Wheatstone bridge circuit.

FIG. 6A–6F present views illustrating a manufacturing process for manufacturing the cantilever type semiconductor distortion sensor of a structure having been explained in connection with FIGS. 1A, 1B particularly illustrating the sectional structure that is viewed along a line 6—6 of FIG. 1A.

Figure 6A:
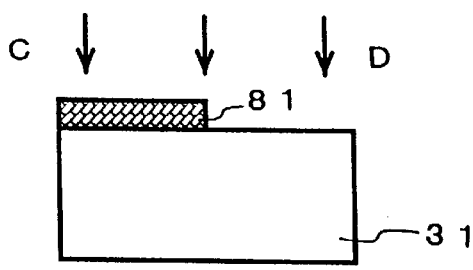
FIGS. 6A to 6F are sectional views illustrating a manufacturing process for manufacturing a cantilever illustrated in FIG. 1.
Figure 6B:
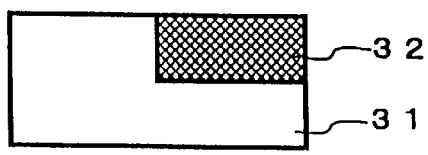
Figure 6C:
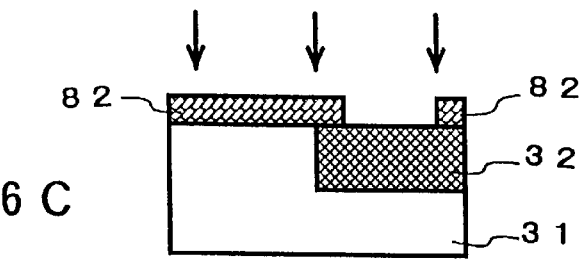

First, the N type semiconductor substrate 31 is etched into the cantilever configuration of FIG. 1 and a resist 81 is coated over the entire region of one surface thereof. Subsequently, using a known photo-resist technique, only the resist portion alone that corresponds to the P-region 32 of FIG. 1B is removed selectively to thereby form the mask. Then a P type impurity (e.g., phosphorus) is ion implanted from the surface of the resulting structure (FIG. 6A). Further, thermal diffusion is performed to thereby form the P-region 32 (FIG. 6B).

Figure 6D:
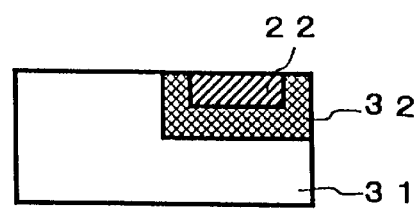
Figure 6E:
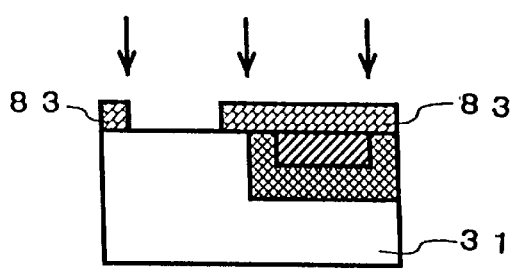

Subsequently, a resist 82 is coated over the entire surface of the resulting structure and then the portion thereof that corresponds to the contact region 22 is opened. Subsequently, a P type impurity is ion implanted (FIG. 6C) and is diffused to thereby form the P+ contact region 22 (FIG. 6D).

Figure 6F:
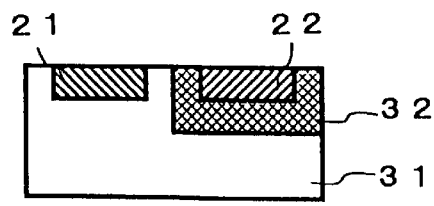

Subsequently, a resist 83 is coated again over the entire surface of the resulting structure and then the portion thereof that corresponds to the contact region 21 is opened. In the same way as mentioned above, an N type impurity (e.g., boron) is ion implanted (FIG. 6E) to thereby form the N+ contact region 21. Finally, a passivation film (not illustrated) is formed over the entire surface of the resulting structure, after which the respective contact regions 21 and 22 are exposed and then aluminum electrode (not illustrated) are connected (FIG. 6F).

Figures 7A, 7B:
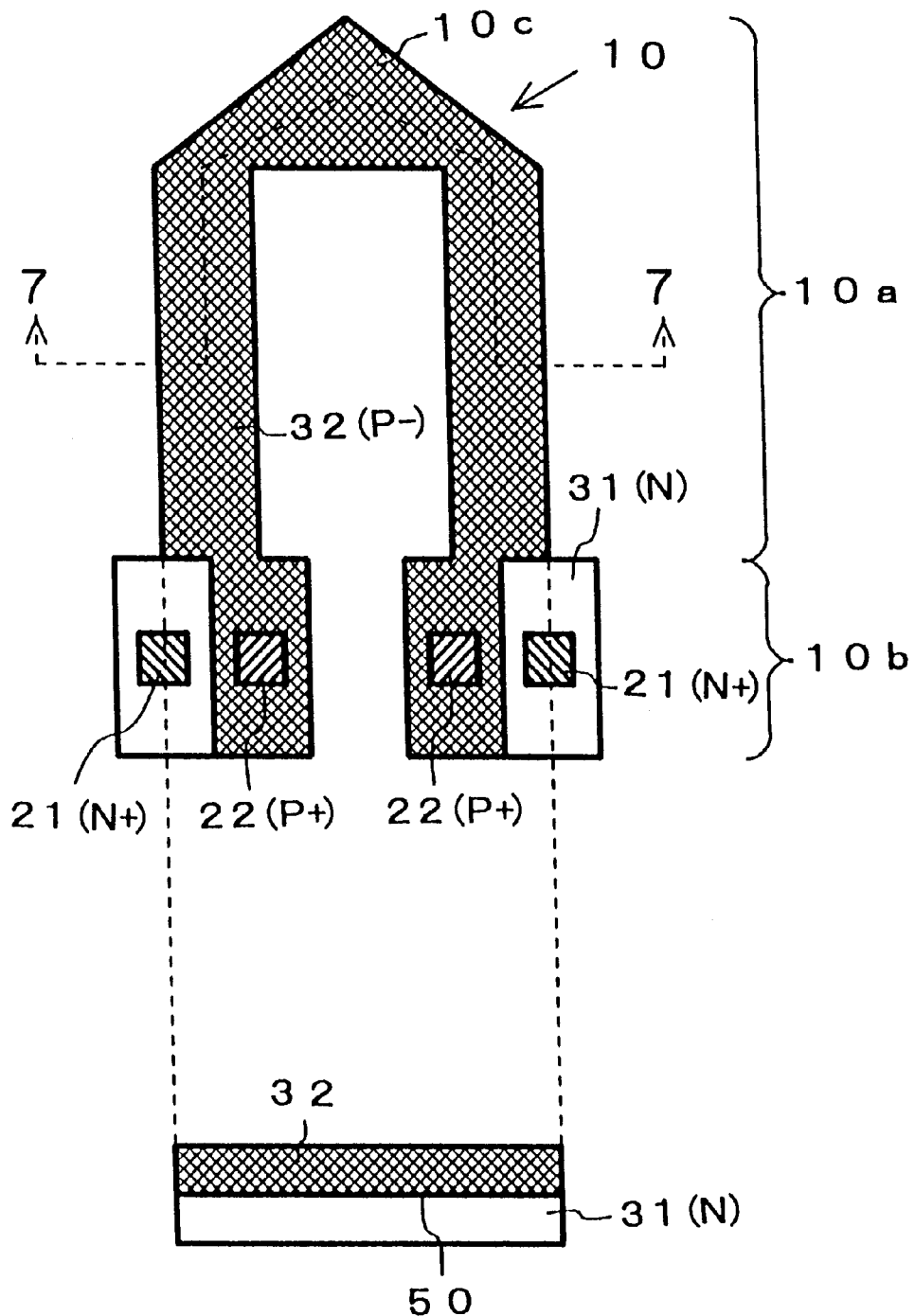
FIGS. 7A and 7B are a plan view and a sectional view illustrating a second embodiment of the present invention.

FIG. 7A presents a plan view illustrating a cantilver according to a second embodiment of the present invention, FIG. 7B is a sectional view taken along a line 7—7 of FIG. 7A and the same reference symbols as mentioned above represents the same or equivalent portions. This embodiment has a feature in that the P– region 32 is formed substantially over the entire surface of the cantilever 10.

That is, in the above-mentioned first embodiment, since the pn junction 50 has been formed in only a part of the surface of the cantilever 10, the area of the pn junction is relatively small. For this reason, there is the feature that whereas the leakage current can be lessened, difficulties arise of attaining the high sensitivity. However, in this second embodiment, since the pn junction 50 is formed over the entire surface of the cantilever 10, there is the merit that, although the leakage current is somewhat increased compared to the first embodiment, a high sensitivity is obtained.

Figure 8:
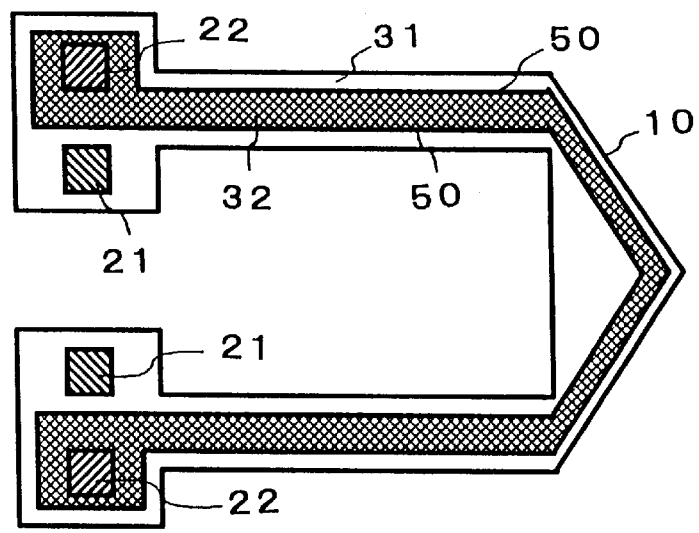
FIG. 8 presents a plan view and a sectional view illustrating a third embodiment of the present invention.

Next, a plan view illustrating a third embodiment of the present invention is given in FIG. 8. It is to be noted that the same symbols as mentioned above represent the same or equivalent portions. This embodiment has a feature in that the P– region 32 is provided in the shape of a strip at the central part of the cantilever 10 so that the pn junction is not exposed to the end surface of the cantilever 10. While the leakage current is produced generally in the vicinity of the end surface of the pn junction, since according to this embodiment the pn junction 50 is not exposed to the end surface of a cantilever 10, the high sensitivity is obtained while suppressing the leakage current, although the manufacturing process becomes more or less complex.

Figure 9:
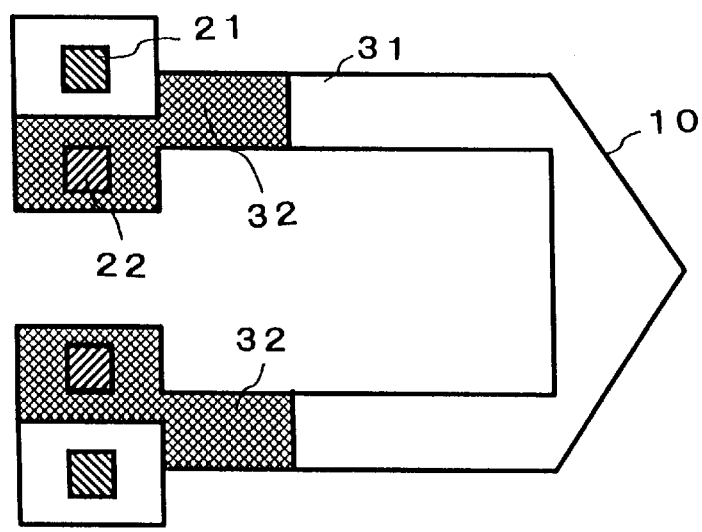
FIG. 9 presents a plan view and a sectional view illustrating a fourth embodiment of the present invention.

Next, a plan view illustrating a fourth embodiment of the present invention is given in FIG. 9. This embodiment is one which has been prepared with it in conceit that when the cantilever 10 has been flexed the U-shaped part as a whole is not distorted and the amount of distortion is the largest at the boundary portion between the cantilever arm portion 10a and the support portion 10b, i.e., at the foot of the cantilever 10, and this amount of distortion is small at portions other than this boundary portion.

This embodiment has a feature in that, as illustrated, the P– region 32 is formed at only the above-mentioned foot portion alone where when the cantilever 10 has been flexed the amount of distortion becomes the largest. According to this embodiment, since no pn junction is formed at the portions that do not contribute to detecting the amount of distortion, a high sensitivity is obtained while suppressing the leakage current.

Figure 10:
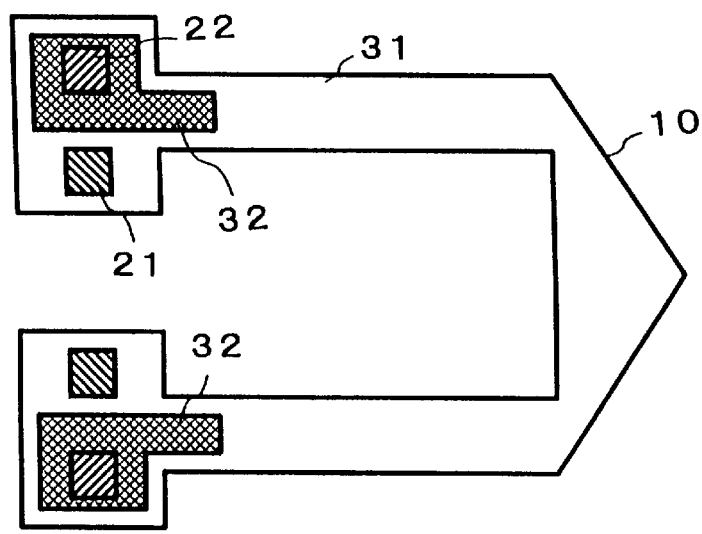
FIG. 10 presents a plan view and a sectional view illustrating a fifth embodiment of the present invention.

Next, a plan view illustrating a fifth embodiment of the present invention is given in FIG. 10. This embodiment has a feature in that, as in the case of the fourth embodiment, the P diffusion region 32 is formed at only the foot portion alone of the cantilever 10 and, in order to decrease the leakage current, the P– diffusion region 32 is provided in the shape of a strip at the central part of the cantilever 10.

Figure 11:
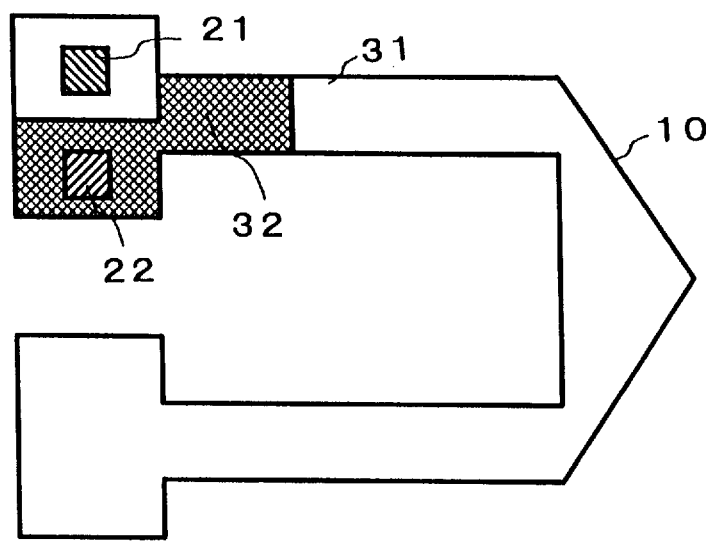
FIG. 11 presents a plan view and a sectional view illustrating a sixth embodiment of the present invention.
Figure 12:
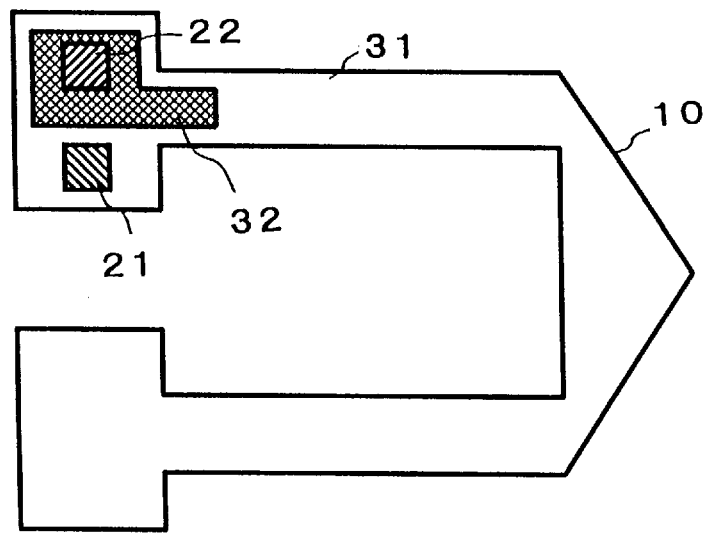
FIG. 12 presents a plan view and a sectional view illustrating a seventh embodiment of the present invention.
Figure 13:
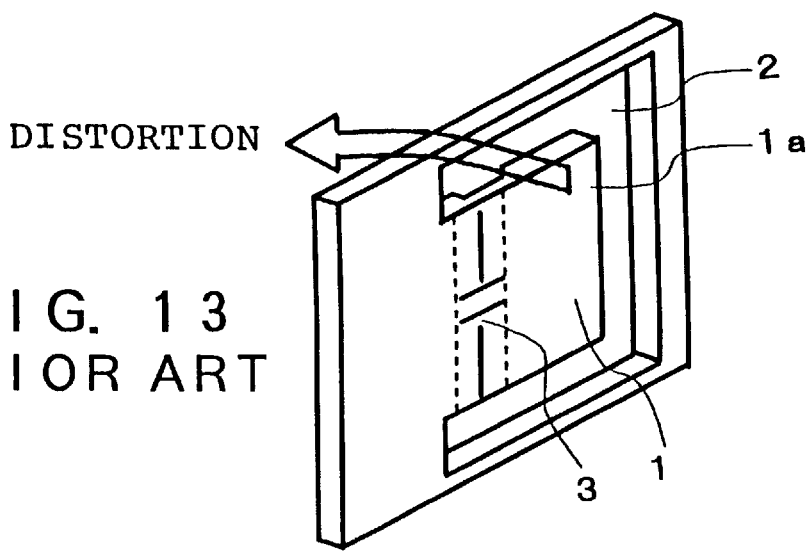
FIG. 13 is a perspective view illustrating a conventional semiconductor distortion sensor

Next, plan views illustrating sixth and seventh embodiments of the present invention are given in FIGS. 11 and 12. Each of the sixth and seventh embodiments has a feature in that the P– diffusion region 32 according to the fourth and fifth embodiments is formed at only one side of the foot portion. According to these embodiments, although the detection sensitivity becomes somewhat low, the leakage current can be decreased largely.

Incidentally, although in each of the above-mentioned embodiments the explanation has been made as obtaining the pn junction by forming the P– diffusion region 32 in the N type substrate 31, conversely to this it may be arranged to obtain the pn junction by forming an N– region in a P type substrate.

Figure 14:
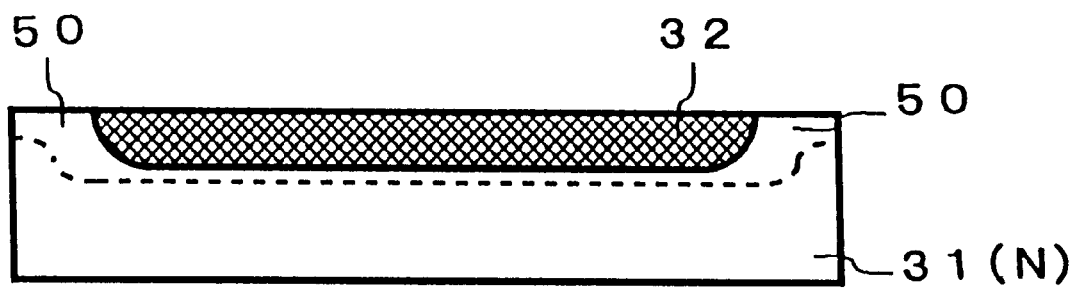
FIG. 14 is a view illustrating a state of a depletion layer that is produced in the pn junction portion.

Meanwhile, as in each of the above-mentioned embodiments explained in connection with FIG. 8, 10 and 12, when forming the p– diffusion region 32 by spacing it from the end of the cantilever so as to prevent the pn junction from being exposed to the end surface of the cantilever 10, as illustrated in FIG. 14, a reverse bias voltage is applied to the pn junction to cause the production of a depletion layer 50, raising possibly the new problem that the leakage current increases with the result that the measurement sensitivity decreases inconveniently. On this account, each of the embodiments of the present invention decribed below is arranged to prevent the spread of the depletion layer and thereby suppress the increase in the leakage current.

FIG. 15–15C presents a plan view illustrating an eighth embodiment of the present invention and a sectional view taken along a line 15—15 thereof, especially illustrating on an enlarged scale a beam and its vicinity that are flexed in corresponding relation to the displacement of the free end. This embodiment has a feature in that, as illustrated in FIG. 15A, the P– region 32 is provided in the shape of a strip at the central part of the beam portion of the cantilever 10 so as to prevent the pn junction from being exposed to the end surface of the cantilever 10. An N+ guard layer 61 for stopping the spread of the depletion layer has been provided in each of the portions of the N type substrate 31 that are exposed between the end portion of the cantilever 10 and the P– region 32. It is to be noted that contact electrodes 32c and 61c are formed respectively on the P– region 32 and N+ guard layer 61.

According to this construction, even when a reverse bias voltage is applied between the P– region 32 and the N type substrate 31 whereby a depletion layer is produced at the pn junction portion, the lateral spread of the depletion layer is stopped by the N+ guard layers 61. This prevents the depletion layer from reaching the end of the cantilever 10. Accordingly, the increase in the leakage current can be suppressed to thereby maintain the measuring sensitivity high. It is to be noted that the N+ guard layer 61 may be formed in only the surface of the N type substrate 31 as illustrated in FIG. 15B or may be formed continuously within the substrate in such a way as to surround the P– region 32 as illustrated in FIG. 15C.

Figure 16A:
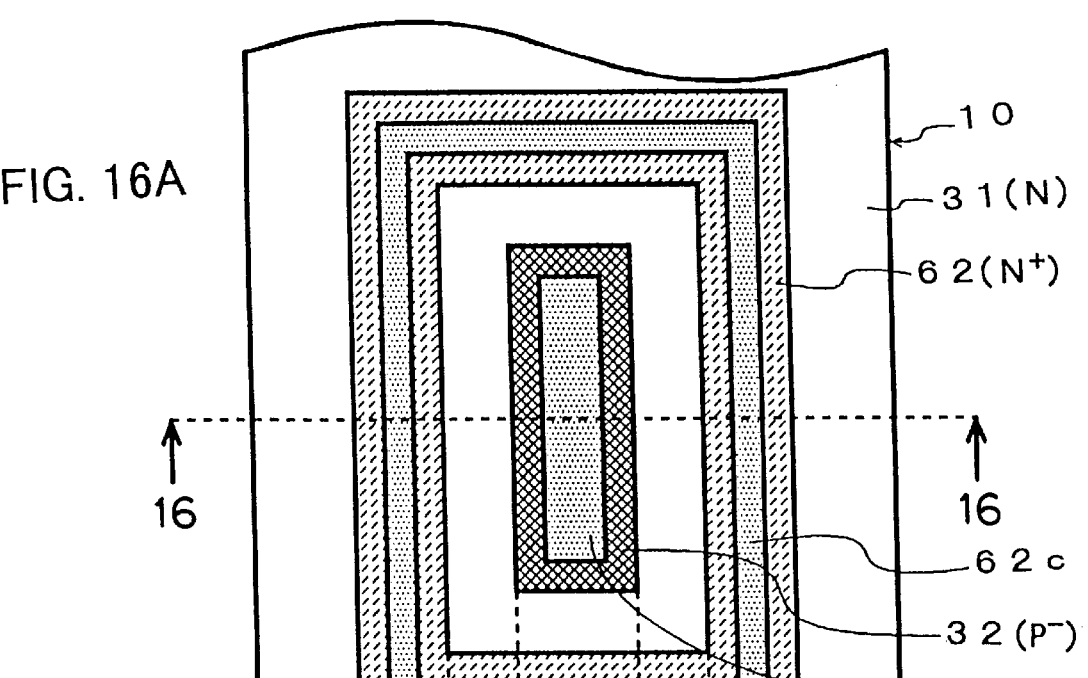
FIG. 16A–16C presents a plan view and sectional views illustrating a ninth embodiment of the present invention.
Figure 16B:
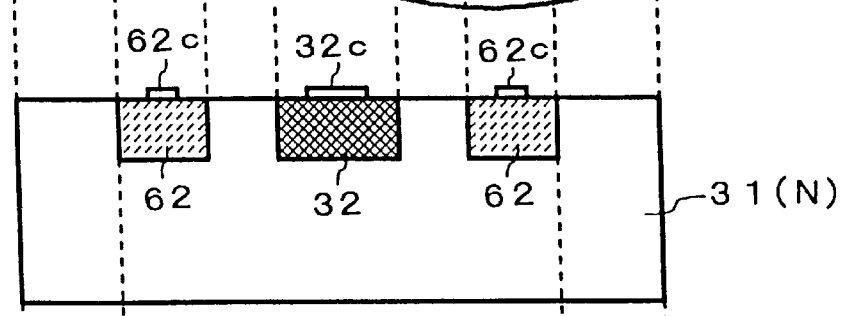
Figure 16C:
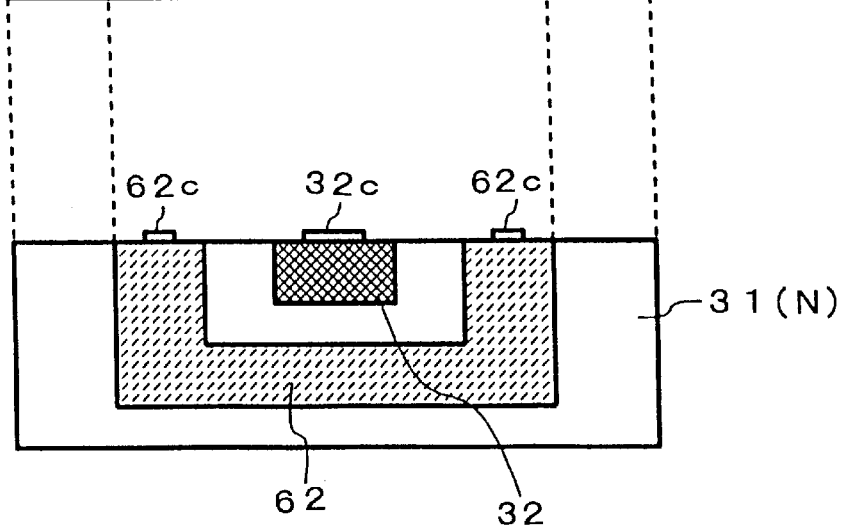

FIG. 16A–16c presents a plan view illustrating a ninth embodiment of the present invention and a sectional view taken along a line 15—15 thereof and the same symbols as mentioned above represent the same or equivalent portions. This embodiment has a feature in that, as illustrated in FIG. 16A, the P– region 32 is provided in the shape of a strip at the central part of the beam portion of the cantilever 10 to thereby prevent the pn junction from being exposed to the end surface of the cantilever 10, and an N+ guard layer 62 is provided in such a way as to enclose the P– region 32. on the surfaces of the P– region 32 and the N+ guard layer 62 there are respectively formed contact electrodes 32c and 62c.

In this embodiment, also, since the lateral spread of the depletion layer is stopped by the guard layer 62 and therefore does not reach the end portion of the cantilever 10, the increase in the leakage current can be suppressed to thereby maintain the measuring sensitivity to be high. It is noted that the N+ guard layer 62 may also be formed in only the surface of the N type substrate 31 as illustrated in FIG. 16B or maybe formed continuously within the substrate in such a way as to surround the P– region 32 as illustrated in FIG. 16C.

FIG. 17A–17B presents a plan view illustrating a tenth embodiment of the present invention and a sectional view taken along a line 17—17 thereof and the same symbols as mentioned above represent the same or equivalent portions. This embodiment has a feature in that, as illustrated in FIG. 17A , the P– region 32 is provided in the shape of a strip at the central part of each of the left and right beam portions of the cantilever 10 so as to prevent the pn junction from being exposed to the end surface of the cantilever 10, and an N+ guard layer 63 is provided in such a way as to surround the P– region 32 from three directions. On the surfaces of the P– region 32 and the N+ guard layer 63 there are respectively formed contact electrodes 32c and 63c.

Figure 18:
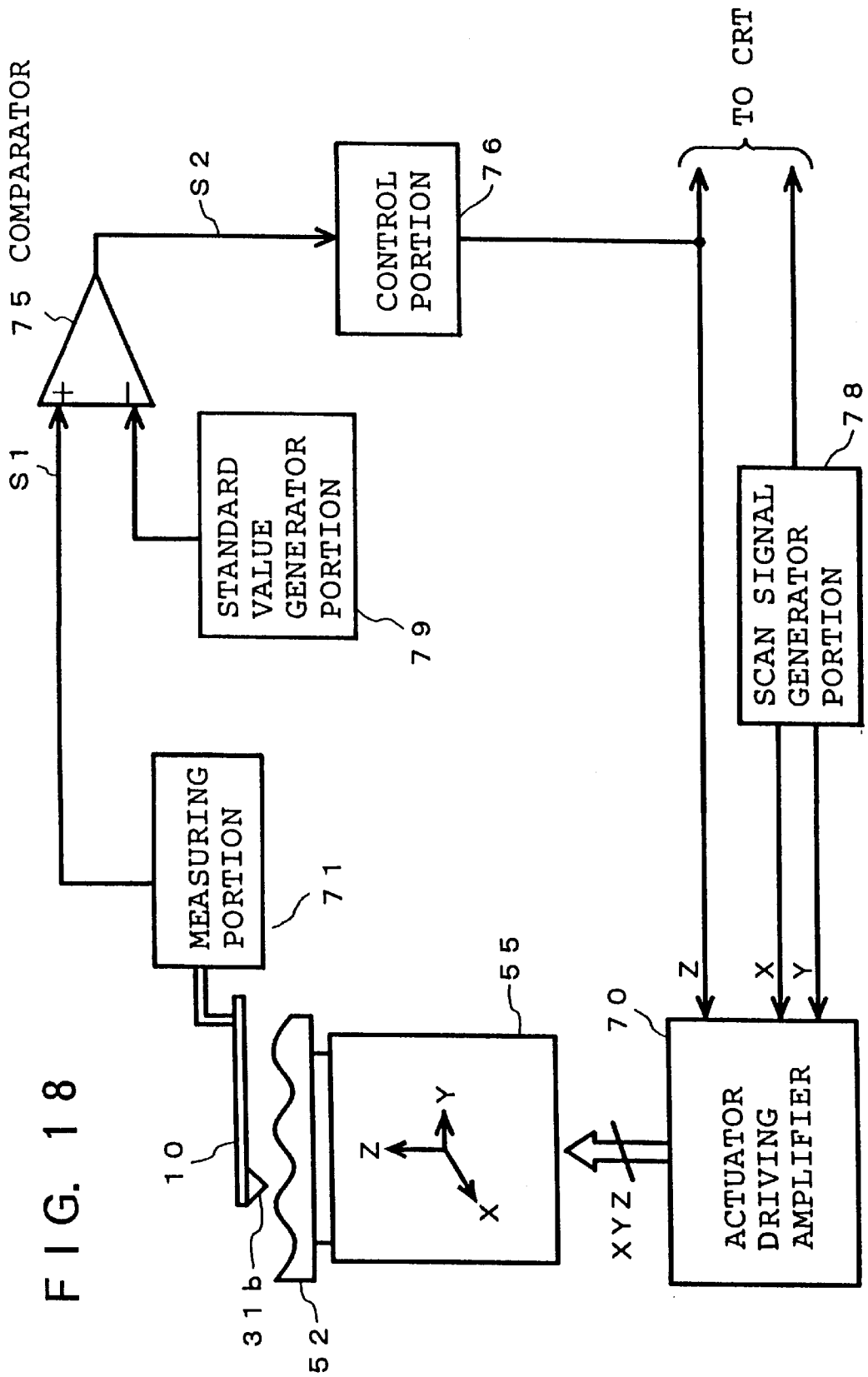
FIG. 18 is a block diagram illustrating a main part of a scanning type probe microscope to which the present invention is applied.

In this embodiment, also, since the lateral spread of the depletion layer is stopped by the guard layer 63 and therefore does not reach the end of the cantilever 10, the increase in the leakage current can be suppressed to thereby maintain the measuring sensitivity high. It is to be noted the N+ guard layer 63 may be formed in only the surface of the N type substrate 31 as illustrated in FIG. 17B or may be formed continuously within the substrate in such a way as to wrap therein or surround the P– region 32 as illustrated in FIG. 17C, FIG. 18 is a block diagram illustrating the construction of a scanning type probe microscope to which the present invention is applied. On a three-dimensional sample stage 55 there is placed a sample 52, above which a probe 31b of the above-constructed cantilever 10 is disposed in such a way as to oppose the sample. The diode characteristic of the pn junction that has been formed in the cantilever 10 is measured by a measuring portion 71 and this measurement signal is input as a flexed-amount signal S1 to a non-inversion input terminal (+) of a comparator 75. To an inversion input terminal (–) of the comparator 75 there is input from a standard value generator portion 79 a standard value regarding the amount of flexure of the cantilever 10 so that, for example, when the amount of flexure is zero, the output of the differential amplifier 75 may be zero. An error signal S2 that is output from the comparator 75 is input to a control portion 76. The control portion 76 controls an actuator driving amplifier 70 so that the error signal S2 may approach zero. Also, the output signal from the control portion 76 is supplied as abrightness signal to a CRT. A scan signal generator portion 78 supplies to the actuator driving amplifier 70 a fine-movement signal for finely moving the sample 52 in the X and Y directions and also supplies a raster scan signal to the CRT.

As has been explained above, according to the present invention, the effects which are described below can be attained.

(1) Since it has been arranged that the pn junction whose electrical characteristics change with a high sensitivity in corresponding relation to the amount of distortion is provided in the cantilever to thereby enable the detection of the amount of flexure of the cantilever as a change in the electrical characteristic of the pn junction, the sensitivity to the amount of flexure of the cantilever is not only enhanced but it is possible to simplify the construction of a detection circuit that is connected to the succeeding stage.

(2) Since the guard layer has been providedbetween the pnjunction and the end portion of the cantilever so as to stop the depletion layer produced in the pn junction portion from reaching the end portion of the cantilever, the increase in the leakage current can be suppressed to thereby maintain the measuring sensitivity high.

(3) When the semiconductor distortion sensor of the present invention is used as the cantilever of a scanning type probe microscope, since it is possible to detect as the electrical characteristics of the pn junction the surface configuration of the sample that is detected as the amount of flexure of the cantilever, it becomes possible to observe the surface configuration of the sample with a high sensitivity.

What is claimed is:

1. A semiconductor distortion sensor comprising: a flexible cantilever having a free end portion and a fixed end portion; a p-type region and an n-type region defining a pn junction formed in a preselected region of the cantilever where stress-caused distortion occurs due to flexure of the cantilever upon displacement of the free end portion of the cantilever; and contact regions formed respectively in the p-type region and the n-type region; wherein when the free end portion of the cantilever is subjected to displacement, the cantilever is flexed and the amount of displacement of the free end portion of the cantilever is detected on the basis of a change in an electrical characteristic of the pn junction.

2. A semiconductor distortion sensor according to in claim 1; wherein the cantilever comprises an n-type semiconductor substrate defining the n-type region; and wherein the p-type region is disposed on the surface of the semiconductor substrate.

3. A semiconductor distortion sensor according to claim 2; wherein the p-type region is a generally strip-shaped region extending along the end portion on one side of the cantilever.

4. A scanning probe microscope having a scanning probe comprising the semiconductor distortion sensor as set forth in claim 3.

5. A semiconductor distortion sensor according to claim 2; wherein the p-type region is formed over an entire surface of the free end portion of the cantilever.

6. A scanning probe microscope having a scanning probe comprising the semiconductor distortion sensor as set forth in claim 5.

7. A semiconductor distortion sensor according to claim 2; wherein the p-type region is formed selectively over only a surface portion of the cantilever disposed between the free end portion and the fixed end portion of the cantilever; wherein the surface portion of the cantilever defines a boundary region of the cantilever and a region of the cantilever contiguous with the boundary region and does not define the entire surface of the cantilever.

8. A scanning probe microscope having a scanning probe comprising the semiconductor distortion sensor as set forth in claim 7.

9. A semiconductor distortion sensor according to claim 2; wherein the cantilever has inner and outer boundary regions disposed between the fixed and free end portions of the cantilever; and wherein the p-type region is a strip-shaped region formed at a central part of the cantilever disposed between and not including the inner and outer boundary regions.

10. A semiconductor distortion sensor according to claim 9; further comprising a highly doped n-type semiconductor region disposed on the surface of the n-type semiconductor substrate and between the p-type strip-shaped region and the inner and outer boundary regions of the cantilever.

11. A scanning probe microscope having a scanning probe comprising the semiconductor distortion sensor as set forth in claim 10.

12. A semiconductor distortion sensor according to claim 10; wherein the highly doped n-type semiconductor region surrounds the p-type strip-shaped region.

13. A semiconductor distortion sensor according to claim 12; wherein the highly doped n-type semiconductor region completely encloses the p-type strip-shaped region.

14. A scanning probe microscope having a scanning probe comprising the semiconductor distortion sensor as set forth in claim 13.

15. A scanning probe microscope having a scanning probe comprising the semiconductor distortion sensor as set forth in claim 12.

16. A scanning probe microscope having a scanning probe comprising the semiconductor distortion sensor as set forth in claim 9.

17. A scanning probe microscope having a scanning probe comprising the semiconductor distortion sensor as set forth in claim 2.

18. A scanning probe microscope having a scanning probe comprising the semiconductor distortion sensor as set forth in claim 1.

19. A semiconductor distortion sensor according to claim 1; wherein the cantilever comprises a support portion disposed at the fixed end portion and an arm portion extending from the support portion and terminating in the free end portion; and wherein the p-type region is formed over an entire surface of the arm portion of the cantilever.

20. A semiconductor sensor comprising: a flexible cantilever having a fixed end portion, an arm portion extending from the fixed end portion and having a free end for undergoing flexural displacement, and a main surface extending between the fixed end portion and the free end of the arm portion and defining inner and outer boundary regions of the cantilever; and a pn junction disposed on the main surface of the cantilever between and not including the inner and outer boundary regions of the cantilever; wherein when the free end of the arm portion of the cantilever is subjected to flexural displacement, the amount of displacement of the free end is detected on the basis of a change in an electrical characteristic of the pn junction.

21. A scanning probe microscope having a scanning probe comprising the semiconductor sensor as set forth in claim 20.

22. A semiconductor sensor comprising: a flexible cantilever having a fixed end portion having a pair of spaced-apart support portions, and an arm portion extending from the fixed end portion and comprised of a pair of spaced-apart arms each connected to one of the staced-apart support portions; and a pn junction disposed only on a surface portion of one of the support portions of the cantilever and on a surface portion of the arm of the cantilever connected to said one support portion; wherein when the cantilever is flexed, the amount of flexure of the cantilever is detected on the basis of a change in an electrical characteristic of the pn junction.

23. A scanning probe microscope having a scanning probe comprising the semiconductor sensor as set forth in claim 25.

24. A semiconductor distortion sensor comprising: a cantilever having a free end, a fixed end, and a p-type region and an n-type region disposed over an entire surface of the free end of the cantilever and forming a pn junction which is subjected to stress-caused distortion due to a displacement of the free end of the cantilever; a contact region formed in the p-type region of the pn junction; and a contact region formed in the n-type region of the pn junction.

25. A scanning probe microscope having a scanning probe comprising the semiconductor distortion sensor as set forth in claim 24.

* * * * *